United States Patent
Khasnis et al.

(10) Patent No.: US 6,728,320 B1
(45) Date of Patent: Apr. 27, 2004

(54) CAPACITIVE DATA AND CLOCK TRANSMISSION BETWEEN ISOLATED ICS

(75) Inventors: Himamshu G. Khasnis, Bangalore (IN); Anjana Ghosh, Bangalore (IN); Krishnan Ramabhadran, Bangalore (IN); Manoj S. Soman, Bangalore (IN); Srinivasan Venkataraman, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 679 days.

(21) Appl. No.: 09/637,729

(22) Filed: Aug. 11, 2000

Related U.S. Application Data (60) Provisional application No. 60/155,616, filed on Sep. 23, 1999.

(51) Int. Cl.[7] .............................. H04B 3/00; H04L 25/00
(52) U.S. Cl. ...................................... 375/257; 375/288
(58) Field of Search ........................ 375/357; 379/412; 370/249; 341/143

(56) References Cited

U.S. PATENT DOCUMENTS

| | | | | |
|---|---|---|---|---|
| 4,280,221 A | * | 7/1981 | Chun et al. ................ | 375/288 |
| 5,384,808 A | * | 1/1995 | Van Brunt et al. .......... | 375/257 |
| 5,500,895 A | * | 3/1996 | Yurgelites ................... | 379/412 |
| 5,654,984 A | * | 8/1997 | Hershbarger et al. ....... | 375/257 |
| 5,655,010 A | | 8/1997 | Bingel | |
| 5,870,046 A | | 2/1999 | Scott et al. | |
| 6,064,326 A | * | 5/2000 | Krone et al. ................ | 341/143 |
| 6,137,827 A | * | 10/2000 | Scott et al. ................. | 375/219 |
| 6,587,560 B1 | * | 7/2003 | Scott et al. ............ | 379/413.02 |

* cited by examiner

*Primary Examiner*—Stephen Chin
*Assistant Examiner*—Lawrence Williams
(74) *Attorney, Agent, or Firm*—J. Dennis Moore; W. James Brady, III; Frederick J. Telecky, Jr.

(57) ABSTRACT

A method for transfer of digital data, comprising a succession of one values and zero values, across a capacitive interface. The interface includes a first capacitor and a second capacitor in parallel, linking a first circuit to a second circuit. First digital data is transferred from the first circuit to the second circuit, and a reference clock is provided by the first circuit and transmitted with the first data to the second circuit for recovery thereby. A first set of bi-level signals representing the zero values of the first data is applied to the first capacitor, such that a repeating level transition of the reference clock corresponds to a first level transition of the first set of bi-level signals. A second set of bi-level signals representing the one values of the first data is applied to the second capacitor, such that the repeating transition of the reference clock corresponds to a second level transition of the second set of bi-level signals. The clock and data are then recovered.

3 Claims, 5 Drawing Sheets

001 CAPACITIVE DATA AND CLOCK TRANSMISSION BETWEEN ISOLATED ICS

This application claims priority under 35 U.S.C. § 119 (e)(1) of provisional application No. 60/155,616 filed Sep. 23, 1999.

TECHNICAL FIELD OF THE INVENTION

This invention relates to isolation systems, and more particularly relates to methods and apparatus for transmission of data and clock signals between integrated circuits isolated from one another through capacitors.

BACKGROUND OF THE INVENTION

Electrical isolation is a requirement in many applications. For example, the telephone line which runs from the local exchange to the customer premises is prone to high voltage surges due to lightening, high voltage lines in proximity to the telephone lines, etc. Frequently, sensitive circuitry in customer premises equipment, such as the computer modem, is coupled to telephone lines, and such circuitry must be protected from such surges. The high voltage surges appearing on telephone lines usually appear on the TIP and RING lines as common mode signals. The modem should be designed to isolate about 1.5 kV of common mode signals on the telephone line from the circuitry.

Traditionally, transformers have provided such isolation. However, transformers are expensive and bulky. As a result, recently, capacitive isolation has been employed, in an effort to reduce the size and cost of the isolation system. In such systems high frequency digital signals are sent across the capacitors, rather than analog signals. This allows the capacitors to have a low capacitance. This keeps the size of the capacitors small at the voltage ratings desired for this purpose, i.e., in the range of 1.5 kV. This creates the need to draw power from the telephone line.

An example of an approach to this type of isolation is found in U.S. Pat. No. 5,870,046, which is entitled "Analog Isolation System With Digital Communication Across a Capacitive Barrier," and is assigned to Silicon Laboratories Inc. However, this approach has extensive circuitry, requiring considerable chip area, and is therefore costly. For example, it calls for the use of a phase locked loop ("PLL") for clock recovery. A phase locked loop takes considerable static current during operation. Hence, its power consumption is high, which is undesirable. Further, PLLs take a large amount of silicon area, which is also undesirable. Still further, when the line side of the interface is sending data, the PLL is free running. However, the PLL should sustain the correct frequency for a considerable amount of time, in order to minimize lock time when the direction of data is reversed, putting a considerable demand on the accuracy of the nominal frequency of the PLL oscillator, and its stability, again adding to cost.

Thus, there is a need for a low cost system for providing electrical isolation between integrated circuits having data and clock signals transmitted between them. Further, there is a need for such a system in which the electrical isolation is provided by capacitors.

SUMMARY OF THE INVENTION

According to one aspect of the present invention a method is provided for transfer of digital data, comprising a succession of one values and zero values, across a capacitive interface. The interface includes a first capacitor and a second capacitor linking a first circuit to a second circuit. The first capacitor and the second capacitor each has a first port connected to the first circuit and a second port connected to the second circuit. First digital data is transferred from the first circuit to the second circuit, and a reference clock is provided by the first circuit and transmitted with the first data to the second circuit for recovery thereby. The method includes the following steps. A first set of bi-level signals representing the zero values of the first data is applied to the first port of the first capacitor, such that a repeating level transition of the reference clock corresponds to a first level transition of the first set of bi-level signals. A second set of bi-level signals representing the one values of the first data is applied to the first port of the second capacitor, such that the repeating transition of the reference clock corresponds to a second level transition of the second set of bi-level signals. The clock and data are then recovered.

According to another aspect of the present invention there is provided a method for transfer of digital data across a capacitor linking a first circuit to a second circuit. The capacitor has a first port connected to an output of a first tri-state buffer of the first circuit, and the capacitor has a second port connected to an output of a first tri-state buffer of the second circuit. A reference clock having a repeating transition from a first level to a second level is provided by the first tri-state buffer to the second circuit through the capacitor, and a succession of digital data signals are transferred by the second tri-state buffer to the first circuit through the capacitor. The method includes the following steps. The first tri-state buffer provides a first one of the repeating transitions to the capacitor, at a first clock time. The first tri-state buffer enters tri-state, after a first predetermined delay period following the first clock time. The second tri-state buffer provides one of the digital data signals to the capacitor, after a second predetermined delay period, longer in duration than the first predetermined delay period, following the first clock time, at a second clock time. The second tri-state buffer enters tri-state prior to a third clock time. Then, if the capacitor is not at the first level, the ports of the capacitor are changed to the first level. The foregoing steps are repeated to transfer additional digital data signals.

According to yet another aspect of the present invention there is provided a method for bi-directional transfer of digital data, comprising a succession of one values and zero values, across a capacitive interface. The interface has a first capacitor and a second capacitor linking a first circuit to a second circuit. The first capacitor and the second capacitor each has a first port connected to the first circuit and a second port connected to the second circuit. First digital data is transferred from the first circuit to the second circuit, and second digital data is transferred from the second circuit to the first circuit. In addition, a reference clock having cycles, the cycles having a first portion and a second portion, is provided to the first circuit and transmitted with the first data to the second circuit for recovery thereby. The method includes the following steps. A first set of bi-level signals representing, during the first portion of the reference clock cycles, the zero values of the first data is applied to the first port of the first capacitor, such that a repeating transition of the reference clock corresponds to a first level transition of the first set of bi-level signals. A second set of bi-level signals representing, during the first portion of the reference clock cycles, the one values of the first data is applied to the first port of the second capacitor, such that the repeating transition of the reference clock corresponds to a second level transition of the second set of bi-level signals. The first digital data is recovered in the second circuit, and the clock is recovered in the second circuit to provide a recovered clock to the second circuit. A third set of bi-level signals representing the zero values of the second data is applied to the second port of the first capacitor during the second portion of the reference clock cycles, and a fourth set of bi-level signals representing the one values of the second data is applied to the second port of the second capacitor during the second portion of the reference clock cycles.

These and other features and aspects of the invention will be apparent to those skilled in the art from the following detailed description of the invention, taken together with the accompanying drawings.

DETAILED DESCRIPTION OF THE PREFERRED EMBODIMENT

The preferred embodiments of the present invention transfer bi-directional data between two ICs. Bi-directional data transfer may be accomplished in two ways. The first way is by full duplex data transfer. In this method, two channels are employed simultaneously. On one channel IC A transfers data to IC B, while on the other channel IC B transfers data to IC A. The second way is by semi-duplex data transfer. In this method, only one channel is needed. One side in the transfer sends a few words of data, while the other side simply receives the data, i.e., it "keeps quiet." Either side may send data to the other in this manner. Thus, at any given time, only one IC is sending data. In fact, this may be considered a form of time division multiplexing of two simplex data transfers, one from IC A to IC B, another from IC B to IC A.

In the preferred embodiments of the present invention, bi-directional data is transferred between two ICs. One of the two ICs is deemed the "master" IC, while the other IC is deemed the "slave" IC. The master IC is the IC which has the original clocking information for the data. In other words, the master IC derives the clock for the data transfer. The slave IC, in turn, must respond to the clock derived by the master IC, in order to receive the data, typically by latching, at the correct time.

Usually, in any kind of serial communication the clock is carried on a separate line. Thus, typically one finds a minimum of three lines, a data line, a clock line and ground. In the preferred embodiments of the present invention bi-directional data transfer is accomplished by way of only two lines. In the prior art, this has been accomplished, but typically by embedding the clocking information in the data itself. On example is the use of Manchester code, which ensures that there is at least one transition per bit, and the use of a phase locked loop ("PLL") on the receive side, which locks onto these transitions in order to recover the clock. The PLL is a complex design, however, and takes both power and silicon area, as discussed above.

Figure 1:
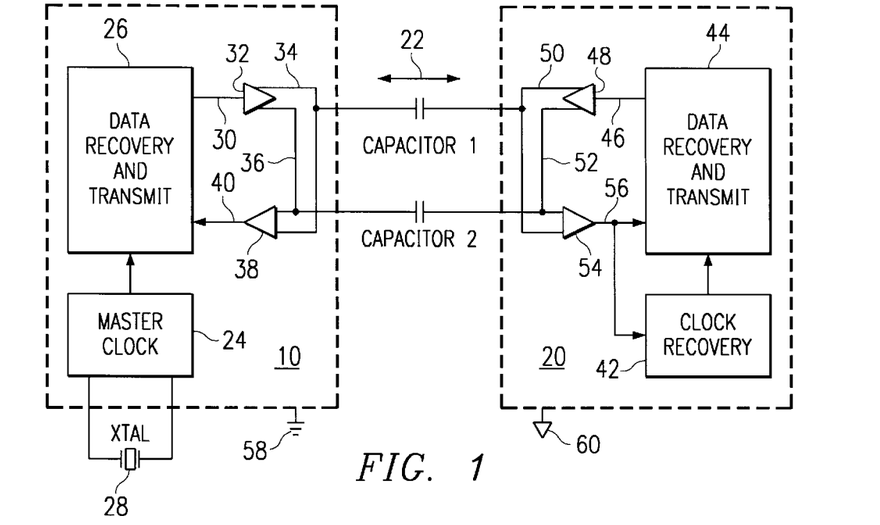
FIG. 1 is a block diagram of an embodiment of the present invention, a data transfer system between two ICs, using capacitive isolation.

FIG. 1 is a block diagram showing a first preferred embodiment of the present invention, a data transfer system between two ICs, using capacitive isolation. In the figure, two ICs are shown, a first IC 10 and a second IC 20. When discussing data transfers IC 10 is referred to as side A, while IC 20 is referred to as side B. Transfer of data between IC 10 and IC 20 is differential, and is made through a capacitive interface comprised of two capacitors, capacitor 1 and capacitor 2. Data transfer is bi-directional, as indicated by arrow 22. Note that while the embodiment depicted in FIG. 1 utilizes differential signal transfer, the principles described in connection with this embodiment are applicable as well to single ended circuits. Modifications for such implementation in single ended circuitry are well within the scope of those of ordinary skill in this art area, once the principles described herein are understood.

IC 10 includes a master clock 24 which provides a master clock signal to a first data recovery and transmit block 26. The master clock runs under control of a piezoelectric crystal 28, although it will be appreciated that any suitable digital clock source may be used. Data is transferred from block 26 on line 30 to a first buffer 32 that both buffers the data on line 28 and converts it to differential form, providing the differential output on lines 34 and 36. Lines 34 and 36 also comprise two inputs to a second buffer 38, the non-differential output of which is provided via line 40 to the first data recovery and transmit block 26. Line 34 is also connected to one side of capacitor 1, while line 36 is connected to one side of capacitor 2.

IC 20 includes a clock recovery block 42 which provides a recovered clock signal to a second data recovery and transmit block 44. Data is transferred from block 44 on line 46 to a third buffer 48 that both buffers the data on line 46 and converts it to differential form, providing the differential output on lines 50 and 52. Lines 50 and 52 also comprise two inputs to a fourth buffer 54, the non-differential output of which is provided via line 56 to the second data recovery and transmit block 44. Line 56 is also provided as an input to the clock recovery block 42. Line 50 is also connected to a second side of capacitor 1, while line 52 is connected to a second side of capacitor 2.

IC 10 is connected to the ground (user) side of the interface, as shown by 58, while IC 20 is connected to the line side of the interface, as shown by 60.

In the arrangement shown in FIG. 1 data is transferred from side A to side B as follows. Data is transmitted from the first data recovery and transmit block 26 to buffer 32, where it is converted to a differential signal for transmission through capacitor 1 and capacitor 2 to buffer 54. Buffer 54 buffers the received signal and provides it to the second data recovery and transmit block 44 and to the clock recovery block 42. The clock recovery block 42 recovers the clock from the received data, and provides the recovered clock to the second data recovery and transmit block 44 to synchronize it with the received data, so that the received data may be latched for further transmission to the telephone line.

In the arrangement shown in FIG. 1 data is transferred from side B to side A as follows. Data is transmitted from the second data recovery and transmit block 44 to buffer 48, where it is converted to a differential signal for transmission through capacitor 1 and capacitor 2 to buffer 38. Buffer 38 buffers the received signal and provides it to the first data recovery and transmit block 26. The first data recovery and transmit block 26 is synchronized by master clock 24 with the received data, so that the received data may be latched for further transmission to digital circuitry (not shown) in user apparatus. The IC 10 on side A sends the clock and is responsible for sending across the capacitor interface the negative edge of the clock. In the arrangement of FIG. 1 clock recovery is possible, and with only two capacitors, and no transformer, its cost should be low.

The preferred embodiments of the present invention utilize a kind of coding from which both data and clock can be recovered. In it, even the clock transitions are coded.

Figure 2:
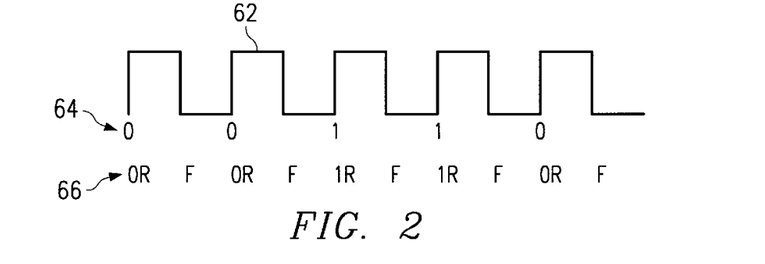
FIG. 2 is a signal diagram of a clock, and of a series of ones and zeros to be transferred.

To better understand this aspect of the preferred embodiments, consider sending across an interface an exemplary data stream of 00110. This data pattern includes all possible combinations in terms of two consecutive-bits. For the purposes of this discussion a clock rising edge is denoted by R, and a falling edge is denoted by F. In FIG. 2 a clock signal 62 is shown, with the exemplary data stream values 64 superimposed beneath the clock signal 62. As shown at 66 this gives rise to four different kinds of transitions:

clock low to high (R) when the data is at 0
clock low to high (R) when the data is at 1
clock high to low (F) when the data is at 0
clock high to low (F) when the data is at 1

A line code of the type provided in this aspect of the present invention thus needs to have four different kinds of transitions. Thus, the line code must have three different levels. A Bipolar Return to Zero code scheme may be used, and it may be made differential to increase the swings.

Now, a first embodiment of a method in accordance with the present invention will be described, in which both a clock signal and data signals are transferred from Side A to Side B. In this code scheme the three different levels are for purposes of discussion herein denominated H (high), L (low) and N (neutral, or intermediate). The four transitions discussed above are assigned to this code scheme as follows:

| Kind of transition | Assigned transition |
| --- | --- |
| clock low to high (R) when the data is at 0 | N to L |
| clock low to high (R) when the data is at 1 | N to H |
| clock high to low (F) when the data is at 0 | L to N |
| clock high to low (F) when the data is at 1 | H to N |

Now, the exemplary data stream described above may be coded as follows, for data transfer in a direction assigned to the clock rising edge:

00110+CLOCK=OR F OR F 1R F 1R F OR F=NLNLNHNHNLN

If this code is sent across any interface, the data and clock can both be reconstructed using the relationships shown below:

For clock recovery:
Clock rising edge: NL or NH
Clock falling edge: LN or HN

For data recovery:
One: NH
Zero: NL

Figure 3:
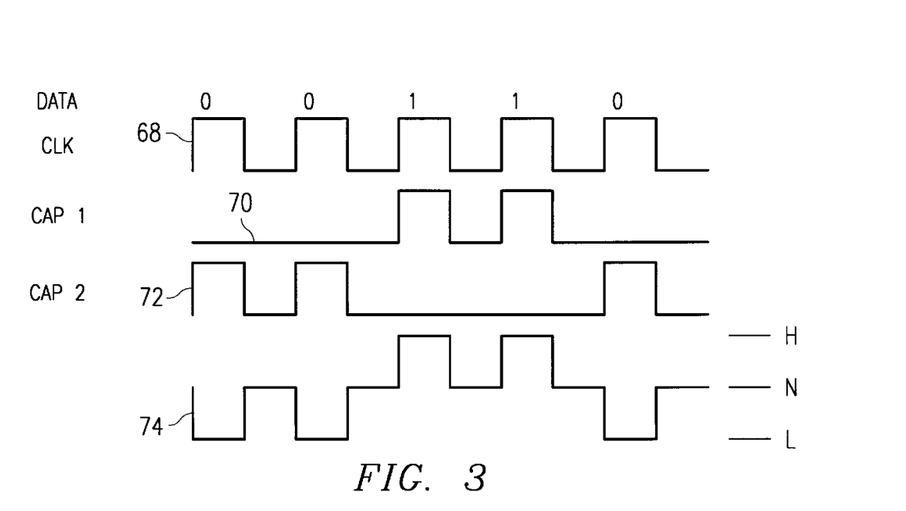
FIG. 3 is a line code for data transfer according to a method of the present invention.

This may be easily implemented using the line code shown in FIG. 3. FIG. 3 is a signal diagram showing the levels of several signals as might appear in a system such as that shown in FIG. 1, against time. The top most signal 68 is the data clock. The next signal below the data clock 68 in the figure, signal 70, is the signal as would appear on capacitor 1. The next signal below that, signal 72, is the signal as would appear on capacitor 2. The bottom most signal in the figure, signal 74, is the equivalent signal on capacitor 1 when capacitor 2 is tied to a reference. Thus, signal 74 is a plot of the voltage of capacitor 1 with respect to capacitor 2. In other words, the plot of signal 74 is the difference between the voltages on capacitor 1 and capacitor 2. As a matter of fact, it is this difference which is utilized in decoding. The three levels, H, N and L, are shown to the right of signal 74 in the figure, for reference.

Figure 4:
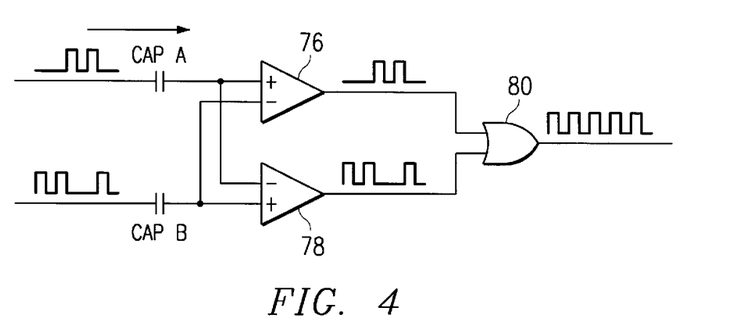
FIG. 4 is a logic diagram for a clock recovery circuit using the line code of FIG. 3.

Clock recovery is straightforward. FIG. 4 is a block diagram showing a simply arrangement for clock recovery. The signal from capacitor 1 is provided to the non-inverting input of a first differential comparator 76 and to the inverting input of a second differential comparator 78. The signal from capacitor 2 is provided to the non-inverting input of differential comparator 78 and to the inverting input of comparator 76. The output of comparator 76 is thus the recovered signal from capacitor 1, while the output of comparator 78 is the recovered signal from capacitor 2. The outputs of comparators 76 and 78 are provided to the inputs of an OR gate 80.

Referring briefly to FIG. 3, note that during each positive going clock pulse a pulse corresponding to a clock pulse appears on either capacitor 1 or capacitor 2, but not on both. Thus, the output of OR gate 80 is the fully recovered clock signal.

Figure 5:
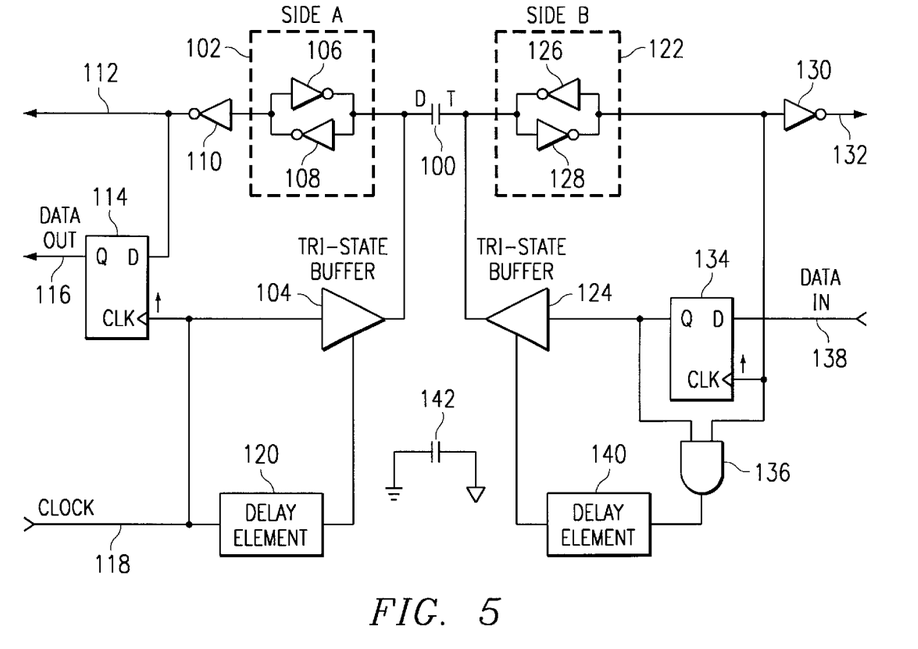
FIG. 5 is a logic diagram for a further embodiment of a data transfer system of the present invention.

FIG. 5 is a logic diagram showing a second preferred embodiment of the data transfer system of the present invention, capable of simplex data transfer from side B to side A. In this embodiment the clock is provided by side A, and is recovered by Side B for use for initiation of data transfer by side B. The clock is also used for data recovery by side A. As in the arrangement of FIG. 1, side A occupies the left side of the figure, and corresponds to a specific IC, while side B occupies the right side of the figure, and corresponds to different IC. A single capacitor, capacitor 100, provides the path for the interface between side A and side B, and provides the desired isolation.

The terminal of capacitor 100 connected to side A, which is denominated the D node in the figure, is connected to the input of a first edge triggered latch 102, and to the output of a first tri-state buffer 104. The latch 102 is comprised of a first inverter 106 and a second inverter 108 connected input-to-output, as shown. The output of latch 102 is connected to a third inverter 110, the output of which is connected to line 112, which may be connected to other circuitry not related to the instant invention. For example, the signal on line 112 may be used for the purpose of testing signal transfers across capacitor 100. The output of inverter 110 is also connected to the D input of a first flip flop 114. The Q output of flip flop 114 is the data out line 116 on which the data transferred to side A is provided. A master clock signal is provided on line 118 to the CLOCK input of flip flop 114, to the input of a delay element 120 and to the input of tri-state buffer 104. The output of delay element 120 is connected to the tri-state enable input of tri-state buffer 104.

The terminal of capacitor 100 connected to side B, which is denominated the T node in the figure, is connected to the input of a second edge triggered latch 122, and to the output of a second tri-state buffer 124. The latch 122 is comprised of a fourth inverter 126 and a fifth inverter 128 connected input-to-output, as shown. The output of latch 122 is connected to a sixth inverter 130, the output of which represents the recovered clock and is connected to line 132. Line 132 may be connected to other circuitry not related to the instant invention, if desired. The output of latch 122 is also connected to the CLOCK input of a second flip flop 134. and to one input of a two input AND gate 136. The Q output of flip flop 134 is connected to the input of tri-state buffer. 124 and to the second input of AND gate 136. The output of AND gate 136 is connected to the input of a delay element 140, the output of which is connected to the tri-state enable input of tri-state buffer 124.

In the circuit shown in FIG. 5, side A drives the interface when the CLOCK signal is high. During this period, the side B driver, tri state buffer 124, is tri-stated. The side A driver, tri-state buffer 104, puts a clock falling edge on the interface and tri-states itself. The side B circuit uses the negative edge, and if it has a 1 to drive, it puts a rising edge on the interface. If it has a 0 to drive it takes no action, i.e., it "keeps quiet." side A senses the voltage on the interface on the next rising edge of the CLOCK signal.

Figure 6:
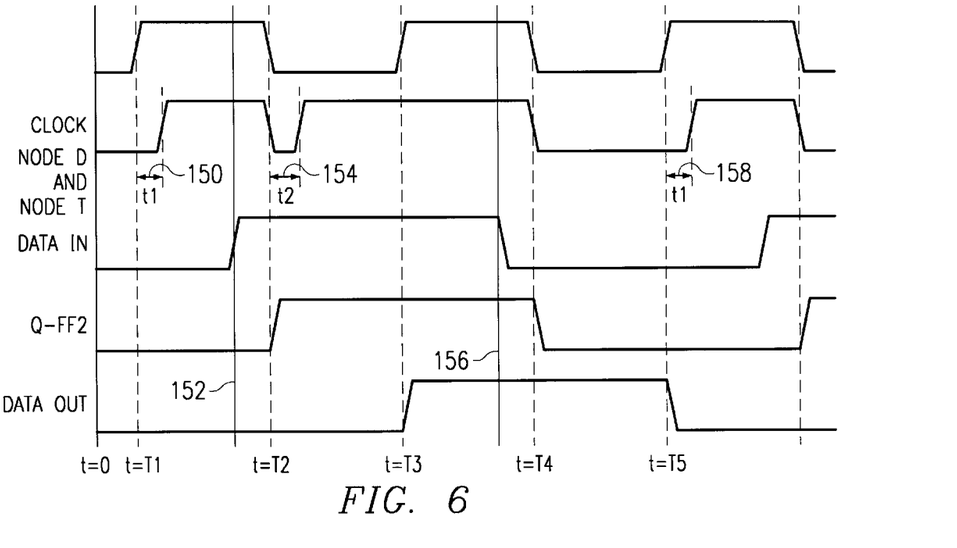
FIG. 6 is a signal diagram of selected signals appearing in the system of FIG. 5 during unidirectional data transfer, showing their relative timings, according to a further method of the present invention.

The sequence of events in the transmission of data in the embodiment of FIG. 5 may be understood in detail by reference to FIG. 6, which shows five signals appearing in that embodiment. Shown in FIG. 6 are the CLOCK signal, the signal appearing at Nodes D and T (being the same), the signal appearing at the D input of flip flop 134, i.e., DATA IN, the signal appearing at the Q output of flip flop 134 and the signal appearing at the D input of flip flop 114. The vertical axis represents signal level, with the lowest level for each signal shown representing signal level 0 for that signal, while time is represented on the horizontal axis. Specific times shown on the horizontal axis are t=0, T1, T2, T3, T4 and T5.

Transmission of a data value of 1 proceeds as follows. Starting with time t=0, the following start up conditions exist:

Node D (&T)=0

CLOCK=0

DATAIN=0.

The tri-state buffer 104 is disabled at this time, having a 0 level at its control input, i.e., the output of delay element 120. Therefore, tri-state buffer 104 presents a high impedance to node D.

At time t=T1 the CLOCK signal goes high. After a delay of t1, shown by arrow 150, which is the delay of the delay element 120, the tri-state buffer 104 is enabled. As soon as tri-state buffer 104 is enabled, this high transition of the CLOCK signal is presented to node D. thus, after the delay of t1 from time t=T1 latch 102 and latch 122 both see a 1 on their respective nodes D and T.

At a time 152 after time t=T1 but sufficiently early to allow settling at the D input of flip flop 134, the DATA IN line 138 goes high presenting a 1 to the D input of flip flop 134.

At time t=T2 the CLOCK signal goes low. Due to the delay of delay element 120, the tri-state buffer remains enabled and so latch 102 and latch 122 both immediately see a 0 on their respective nodes D and T. After a delay of t1, the tri-state buffer 104 is again disabled, presenting a high impedance to node D, which occasions no level change in the levels on nodes D and T. On side B the transition to 0 at node T that occurred at T2, is latched by latch 122, which presents a transition to 1 to the rising edge triggered CLOCK input of flip flop 134. The D input of flip flop 134 (DATA IN) being a 1, the Q output of flip flop 134 immediately goes to 1. Thus, the two inputs to AND gate 136 are driven immediately to 1, enabling its output to present a transition to 1 to the delay element 140. This transition to 1 is delayed by an interval t2, shown by arrow 152, by delay element 140, after which delay the tri-state buffer 124 is enabled, allowing the 1 at the Q output of flip flop 134 to drive node T (and node D) to a 1. Interval t2 should be selected to be slightly longer than interval t1, to ensure enough time for the tri-stating of tri-state buffer 104 after the CLOCK signal returns to 0, as discussed above.

Thus, a data value of 1 provided by side B has been put on the interface in response to a CLOCK signal provided by side A. The 1 at node D is inverted by latch 102 and re-inverted to a 1 by inverter 110, presenting a 1 to the D input of flip flop 114. The CLOCK signal, and thus the CLOCK input of flip flop 114, is at 0, however, and so no change of state occurs in flip flop 114.

The transition to 1 at node T changes the state of latch 122, presenting a 0 to one input of AND gate 136, driving the output of AND gate 136 to 0. After another delay of t2 the output of delay element 140 goes low, disabling tri-state buffer 124, which then presents a high impedance to node T, which occasions no level change in any signal.

At time t=T3 the CLOCK signal goes high which immediately presents a positive transition to the rising edge triggered CLOCK input of flip flop 114. The D input of flip flop 114 being a 1, the data value on the interface, the Q output of flip flop 134 (DATA OUT) immediately goes to 1. The transmission of the data value of 1 is thus accomplished. Tri-state buffer 104 subsequently, after a delay of t1, is enabled, and the cycle repeats.

At a time 156 after t=T3, and after tri-state buffer 124 is disabled, but sufficiently early to allow settling at the D input of flip flop 134, the DATA IN line 138 goes low presenting a 0 to the D input of flip flop 134.

The transmission of the data value of 0 proceeds as follows. Starting with time t=T4, the CLOCK signal goes low. Delay element 120 delays the disabling of tri-state buffer 104 by t1, and so the negative CLOCK transition is seen immediately on side B, at node T. Latch 122 latches this value, thus presenting a rising edge to the rising edge triggered CLOCK input of flip flop 134. The D input of flip flop 134 being a 0, the Q output of flip flop 134 immediately goes to 0, thus holding node T at a 0, and causing the output of AND gate 136 to remain at a 0, maintaining tri-state buffer 124 disabled. Thus, the interface remains at a 0. With node D at 0, the D input of flip flop 114 is also at 0.

At time t=T5 the CLOCK signal goes high, which immediately presents a positive transition to the rising edge triggered CLOCK input of flip flop 114. The D input of flip flop 114 being a 0, the data value on the interface, the Q output of flip flop 134, connected to the DATA OUT line 116, immediately goes to 0. After a delay of t1, as shown by arrow 158, the output of delay element 120 goes high, enabling the tri-state buffer 104, causing it to present the CLOCK signal to node D, which rises to a 1. The Q output of flip flop 134 remains at 0, however. The transmission of the data value of 0 is thus accomplished.

Full duplex data transfer may be accomplished between two integrated circuit chips, by a further embodiment of method in accordance with the present invention, again using two capacitors, denominated capacitor 1 and capacitor 2, for isolation. As before, in the discussion that follows, the part of the system on one side of the isolation capacitors is referred to as side A, while the part of the system on the other side of the isolation capacitors is referred to as side B, each side having one of the two ICs.

The data that needs to be transferred between Side A and Side B are of three types, as follows:
  i) a clock waveform to be transferred from Side A to Side B,
  ii) data bits to be transferred from Side A to Side B, and
  iii) data bits to be transferred from Side B to Side A. In implementing the protocol, the potential at the plates of each capacitor is allowed to swing between Supply, Half Supply and Ground. In this discussion, it is assumed that Supply=3V, Half Supply=1.5V and Ground=0V. Data from Side A is transferred along with the clock in the clock high period After both the rising edge and falling edge of the clock have been transferred and the falling edge of the clock have been sensed at the Side B, the data from Side B gets transferred to Side A. This data transfer is completed before the next rising edge of Side A Clock occurs.

When voltage of one plate (plate 1) of a capacitor is varied, the variation gets coupled to the second plate (plate 2) of the capacitor; the transition at plate 2 is sampled and plate 2 is held at the changed potential until the next voltage variation occurs. Thus a waveform applied at one plate of the capacitor can be duplicated at the other plate of the capacitor.

When no data transfer is taking place across the capacitors, each plate of the capacitors is precharged to 1.5V. When any data has to be transferred, a 1.5V→3V pulse is applied to the plate of one capacitor and a 1.5V→0V pulse is applied to the plate of the second capacitor. Opposite swings are always applied in this embodiment at the plates of the two capacitors, thus ensuring that fully differential mode transfer occurs across the capacitors. Again, however, it should be noted that this embodiment may be implemented in single ended circuitry. When the data bit to be sent from Side A is 1, a positive pulse (1.5V→3V) is applied to capacitor 1 and a negative pulse (1.5V→0V) is applied to capacitor 2. When the data bit is 0, the reverse occurs; i.e., a positive pulse is applied to capacitor 2 and a negative pulse to capacitor 1. The pulses sent from Side A have a width equal to the high period of the Side A clock. So, at Side B, the positive half of each Side A clock gets reproduced at the plates of the two capacitors as a positive or a negative pulse of the same width as the clock half. These pulses are then decoded to get the clock and data.

Once the positive half of the clock has been recovered by Side B, data is sent from Side B to Side A, following the same convention, i.e., positive and negative pulses applied to the plate of each capacitor, the value of the data bit determining whether a positive or a negative pulse needs to be applied to a particular capacitor. The width of the pulse sent by Side B is kept narrow compared to the low period of the clock. So, the data transfer from Side B to Side A is completed before the succeeding rising edge of the Side A clock occurs. The output drivers, that drive the capacitors at the Side A end, are tri-stated during this time, so that Side B can drive the capacitors. Thus, in the low period of the clock, Side A samples the capacitor plates and recovers the narrow pulses sent by Side B. These pulses are then decoded to obtain the value of the data bit.

Figure 7:
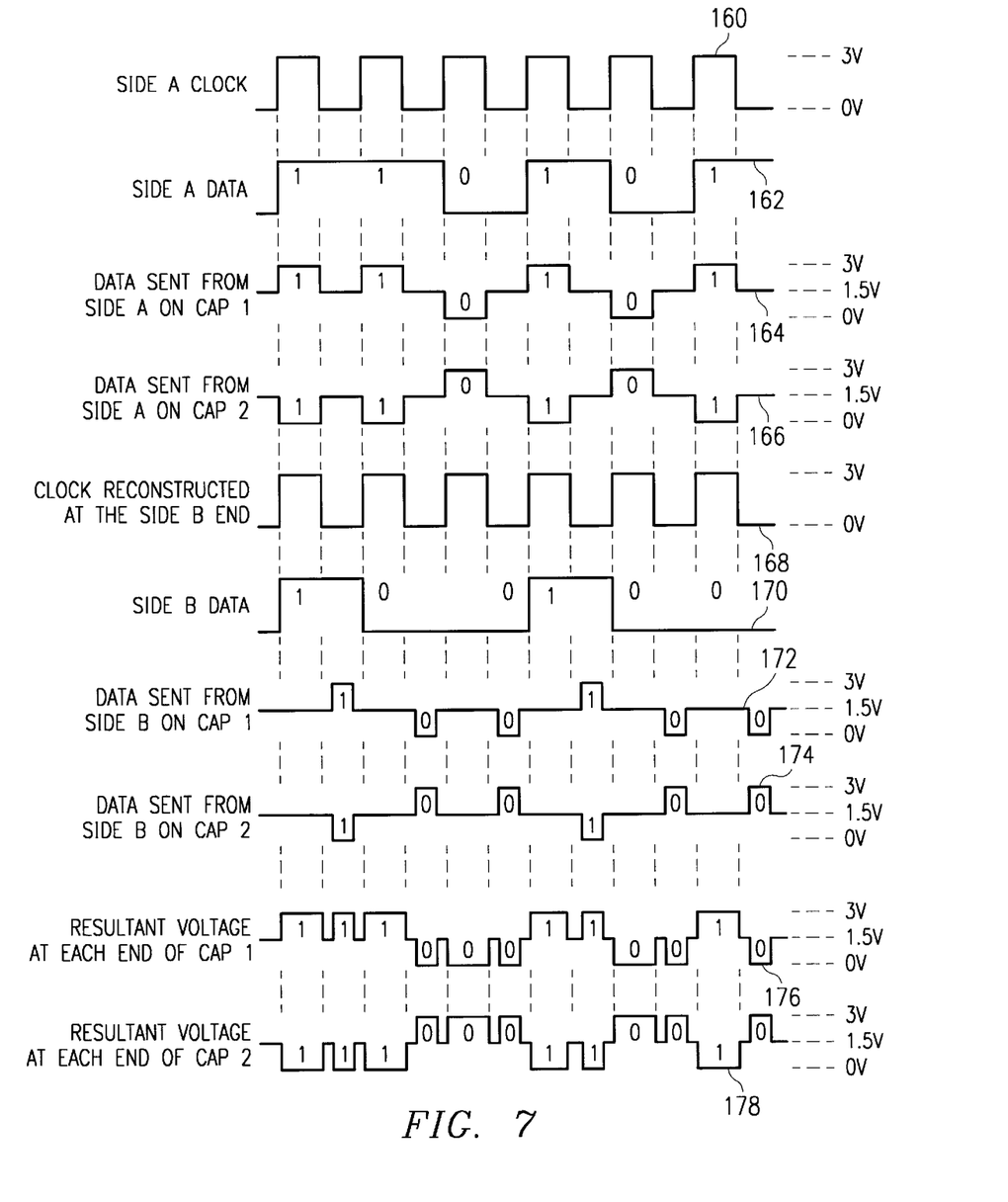
FIG. 7 is a signal diagram of selected signals appearing in the system of FIG. 5 during bi-directional data transfer, showing their relative timings, according to a still further method of the present invention.

FIG. 7 is a signal diagram showing the voltage waveforms appearing on capacitor 1 and capacitor 2 while data transfer occurs according to this protocol. The Side A clock is shown as graph 160, while the data provided to Side A for transmission is shown as graph 162. The data sent from Side A on capacitor 1 is shown as graph 164, while the data sent from Side A on capacitor 2 is shown as graph 166. The clock reconstructed in the Side A integrated circuit is shown as graph 168. The data provided to Side B for transmission is shown as graph 170. The data sent from Side B on capacitor 1 is shown as graph 172, while the data sent from Side B on capacitor 2 is shown as graph 174. The resultant voltage on each plate of capacitor 1 is shown as graph 176. The resultant voltage on each plate of capacitor 2 is shown as graph 178.

Figure 8:
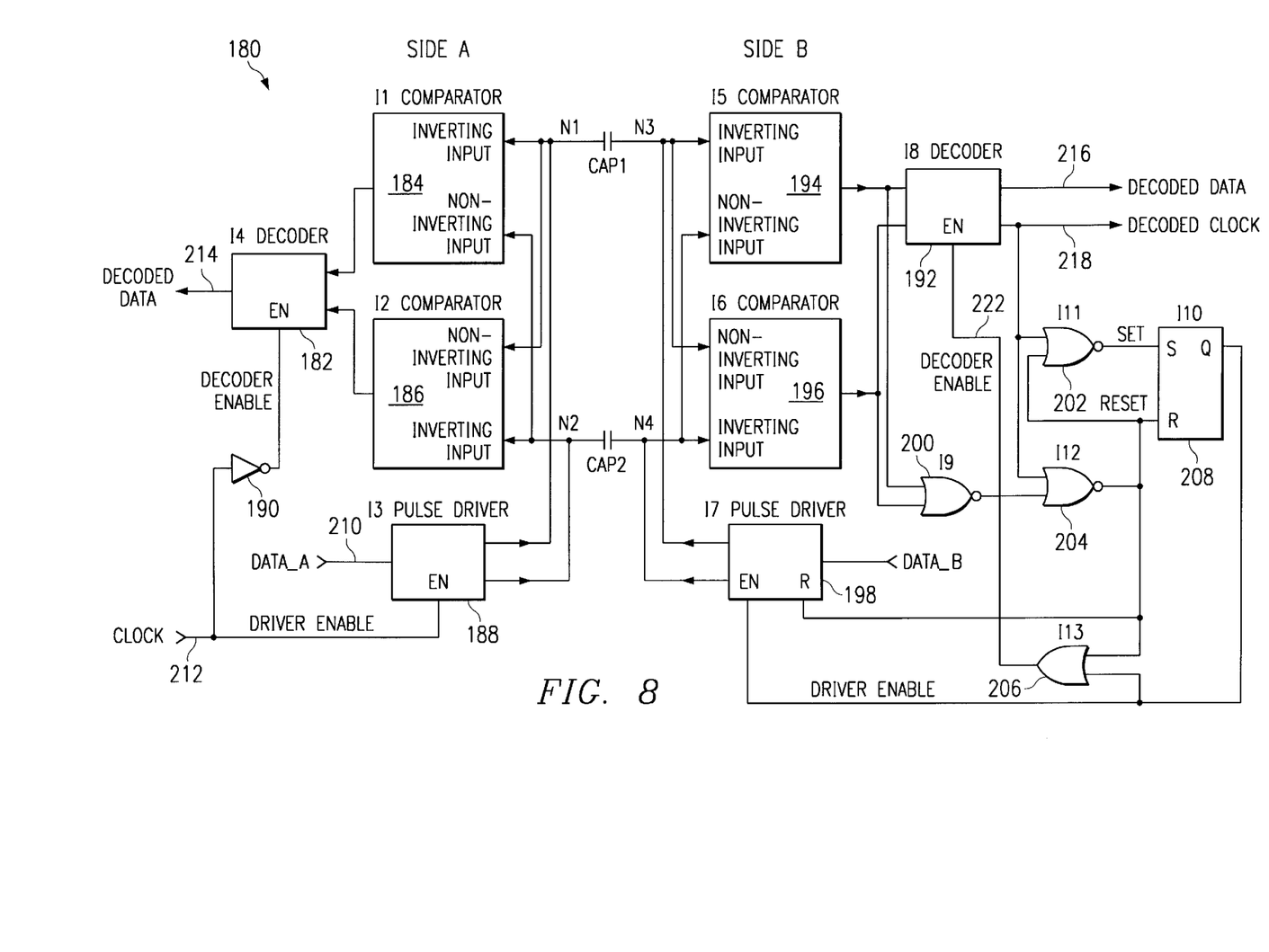
FIG. 8 is a logic diagram for still further embodiment of a data transfer system of the present invention.

A block diagram representation of a circuit 180 capable of implementing the above scheme is shown in FIG. 8. Each block in the circuit of FIG. 8 is known, and may be implemented in silicon by those of ordinary skill in this art.

The circuit of FIG. 8 includes capacitor 1, CAP1, and capacitor 2, CAP2, which divide the circuit into a Side A and a Side B, as shown. Side A includes a first decoder 182, a first comparator 184, a second comparator 186, a first pulse driver 188, and an inverter 190. Side B includes a second decoder 192, a third comparator 194, a fourth comparator 196, a second pulse driver 198, a first NOR gate 200, a second NOR gate 202, a third NOR gate 204, an OR gate 206, and a set-reset flipflop 208.

On Side A, the data provided to Side A for transmission (graph 162, FIG. 7) is provided on line 210, which is connected to the data input to pulse driver 188. The Side A clock is provided on line 212, which is connected to the ENABLE input of pulse driver 188, and is connected to the input of inverter 190. The output of inverter 190 is connected to the ENABLE input of decoder 182. The output of decoder 182 is connected to Side A output line 214, which carries the DECODED DATA signals.

The differential output lines of pulse driver 188 are connected to the Side A plates of CAP1 and CAP2, nodes N1 and N2, respectively. Also connected to nodes N1 and N2 are the differential inputs of comparator 184 and of comparator 186. The outputs of comparator 184 and of comparator 186 are connected to the inputs of decoder 182.

On Side B, the differential output lines of pulse driver 198 are connected to the Side B plates of CAP1 and CAP2, nodes N3 and N4, respectively. Also connected to nodes N3 and N4 are the differential inputs of comparator 194 and of comparator 196. The outputs of comparator 194 and of comparator 196 are connected to the inputs of decoder 192 and to the inputs of NOR gate 200. The output of NOR gate 200 is connected to a first input of NOR gate 204. The outputs of decoder 192 are connected to lines 216 and 218, which carry the DECODED DATA signals and DECODED CLOCK signals, respectively. Line 218 is also connected to a first input of NOR gate 202, and to a second input of NOR gate 204. The output of NOR gate 204 is connected to line 220, which carries the RESET signal. Line 220 is connected to a RESET input of flipflop 208, to a second input of NOR gate 202, to a first input of OR gate 206 and to a RESET input of pulse driver 198. The output of NOR gate 202 carries the SET signal, and is connected to a SET input of flipflop 208. The Q output of flipflop 208, which carries the DRIVER ENABLE signal, is connected to a second input of OR gate 206 and to an ENABLE input of pulse driver 198. The output of OR gate 206 is connected to line 222, which carries the DECODER ENABLE signal and which is connected to an ENABLE input of decoder 192.

Figure 9:
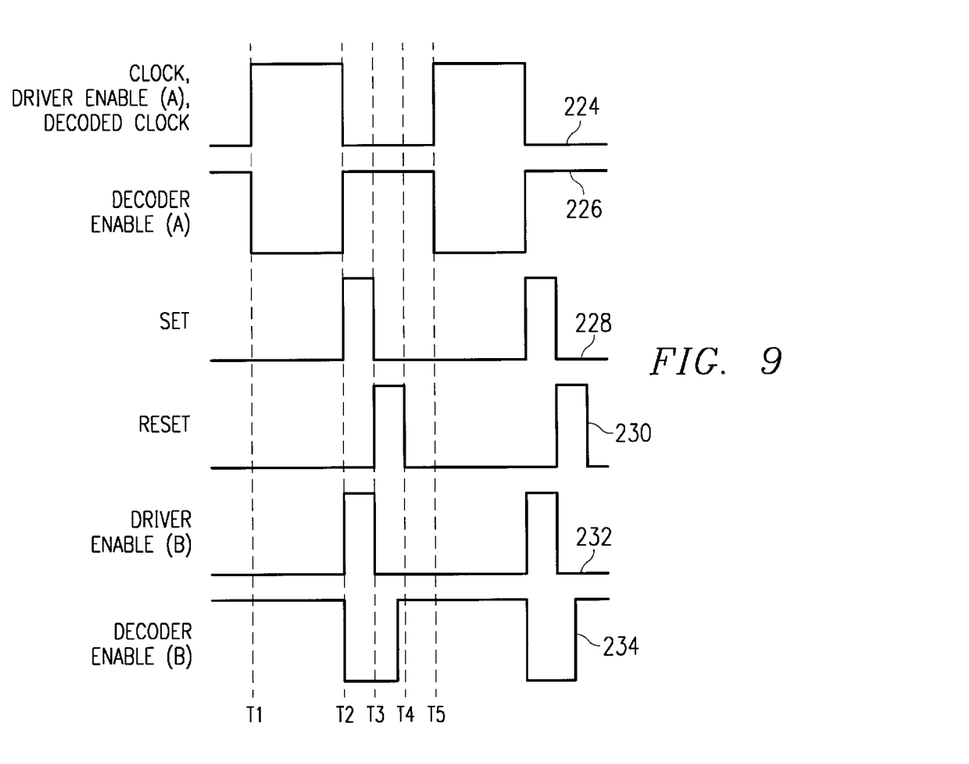
FIG. 9 is a signal diagram of selected signals appearing in the system of FIG. 8.

FIG. 9 is a signal timing diagram showing graphs of signals relevant to the operation of the circuit of FIG. 8. In FIG. 9, the vertical axis represents time, and is common for all graphs. The horizontal axis of each graph represents signal level, each signal alternating between two levels. The graphs are vertically time aligned, to aid in understanding the relative timings of the signals depicted in the figure.

Included in FIG. 9 is a graph 224 for the CLOCK signal, the DRIVER ENABLE signal for Side A, and for the DECODED CLOCK signal, all having the same waveform and timing. Also included is a graph 226 for the DECODER ENABLE signal for Side A, a graph 228 for the SET signal, and a graph 230 for the RESET signal. Also included is a graph 232 for the DRIVER ENABLE signal for Side B, and a graph 234 for the DECODER ENABLE signal for Side B. Timing points T1, T2, T3, T4 and T5, used in the discussion of the operation of the circuit of FIG. 8, are also shown.

Now, referring to both FIG. 8 and FIG. 9, the plates of CAP1 and CAP2 are held at 1.5 v when no data is being transferred. This is achieved by resetting mechanisms in the Pulse Driver Blocks 188 and 198, on Side A and Side B, respectively. When either side is to transfer data, the Pulse Driver Block of the particular side sends a positive pulse (1.5V→3V) on CAP1 and a negative pulse (1.5V→0V) on CAP2 if the data bit is "1" and the reverse for data bit "0". This is achieved by switching a positive pulse generator and a negative pulse generator block (not shown) between CAP1 and CAP2, depending upon status of the data bit. Note that in the figure, the positive pulse generator and negative pulse generator blocks have been combined and labeled as Pulse Driver block. The actual generation of the positive and negative pulses is achieved through an arrangement of current sources.

The sequence events in the operation of circuit 180 is as follows. At time T1, the CLOCK signal goes high. This enables the Pulse Driver 188 to drive the capacitors CAP1 AND CAP2. Nodes N1 and N2 get positive/negative voltage swings. Nodes N3 and N4 duplicate these voltage transitions. The two comparator blocks on Side B, 194 and 196, sense the differential voltages appearing at N3 and N4, and the outputs of these two comparators are decoded by the Decoder block 192 to recover the data and clock. The outputs of the decoder block 192, on lines 216 and 218, the DECODED DATA signal and the DECODED CLOCK signal, respectively, represent the respective data and clock recovered by the Decoder 192.

At time T2, the CLOCK goes low, and the nodes N1 and N2 are pulled to 1.5 v by the Pulse Driver circuit 188. Nodes N3 and N4 duplicate this change in voltage through capacitive coupling across CAP1 and CAP2. Thus, effectively, a positive and a negative pulse get transmitted across the capacitors in the positive half of the clock. After this, the Pulse Driver block 188 on Side A is disabled and the capacitors are no longer driven by 188.

At T2, with both nodes N3 and N4 at 1.5 v, the outputs of both the comparators 194 and 196, on Side B, go low. This makes the RESET signal on line 220 go low. With the DECODED CLOCK and RESET signals both at logic low, the SET signal goes high and the flip flop 208 gets set. As a result, the DRIVER ENABLE signal goes high. This enables the Pulse Driver Block 198 to drive the CLINK with a positive and a negative voltage swing at the plates of the two capacitors CAP1 and CAP2.

On Side B, the voltage swings, applied to nodes N3 and N4 are sensed as differential voltages by the two comparators 194 and 196. Depending upon which capacitor plate has received a positive voltage transition, the output of one of the two comparators goes high. The two outputs of the comparators 194 and 196, sent through a logical OR operation in NOR gate 200 (followed by NOR gate 204) results in RESET going logic high at time T3. This resets the flipflop 208, and DRIVER ENABLE goes low. The pulse width of the signal DRIVER ENABLE depends upon the time taken by the pulse Driver 198 to impart the voltage transitions on nodes N3 and N4 the time taken by the comparators 194 and 196 to sense the differential voltage, and the propagation delay through the NOR gates 200 and 204 and the flipflop 208.

At T3, after DRIVER ENABLE goes low, the Pulse Driver Block 198 pulls nodes N3 and N4 to 1.5 v. Once the plates of both CAP1 and CAP2 have been pulled to 1.5 v, both the outputs of the comparators 194 and 196 return to logic low, and the RESET signal goes low at time T4. This shuts off the Pulse Driver block 198. Thus, effectively, a narrow pulse gets transferred across each capacitor.

On Side A, the comparators 184 and 186 sense these narrow pulses and the Decoder block 182 decodes the data.

The decoder block 192 on Side B is enabled by its DECODER ENABLE signal. This signal disables decoder 192 when the Side B is driving the capacitors, i.e., for the duration of the interval during which a narrow pulse gets transmitted from Side B to Side A. This is to prevent the decoder 192 from interpreting the voltage swings on the capacitor plates as data sent from Side A.

At time T5, when the clock goes high, the Side A again takes control of driving the capacitors.

Although the present invention and its advantages have been described in detail, it should be understood that various changes, substitutions and alterations can be made herein without departing from the spirit and scope of the invention as defined by the appended claims.

What is claimed is:

1. A method for transfer of digital data across a capacitor linking a first circuit to a second circuit, wherein said capacitor has a first port connected to an output of a first tri-state buffer of said first circuit and said capacitor has a second port connected to an output of a second tri-state buffer of said second circuit, wherein a reference clock, said reference clock having a repeating transition from a first level to a second level, is provided by said first tri-state buffer to said second circuit through said capacitor, and wherein a succession of digital data signals are transferred by said second tri-state buffer to said first circuit through said capacitor, comprising the steps of:

causing said first tri-state buffer to provide a first one of said repeating transitions to said capacitor, at a first clock time;

causing said first tri-state buffer to enter tri-state, after a first predetermined delay period following said first clock time;

causing said second tri-state buffer to provide one of said digital data signals to said capacitor, after a second predetermined delay period, longer in duration than said first predetermined delay period, following said first clock time;

then, causing said second tri-state buffer to enter tri-state prior to a second clock time prior to a next one of said repeating transitions;

then, if said capacitor is not at said first level at said second clock time, causing said ports of said capacitor to change to said first level prior to said next one of said repeating transitions; and repeating the foregoing steps.

2. A method for bi-directional transfer of digital data, comprising a succession of one values and zero values, across a capacitive interface having a first capacitor and a second capacitor linking a first circuit to a second circuit, wherein said first capacitor and said second capacitor each has a first port connected to said first circuit and a second port connected to said second circuit, and wherein first digital data is transferred from said first circuit to said second circuit, wherein second digital data is transferred from said second circuit to said first circuit, and wherein a reference clock, said reference clock having cycles, said cycles having a first portion and a second portion, is provided to said first circuit and transmitted with said first data to said second circuit for recovery thereby, comprising the steps of:

applying a first set of bi-level signals representing, during said first portion of said reference clock cycles, said zero values of said first data to said first port of said first capacitor, wherein a repeating transition of said reference clock corresponds to a first level transition of said first set of bi-level signals;

applying a second set of bi-level signals representing, during said first portion of said reference clock cycles, said one values of said first data to said first port of said second capacitor, wherein said repeating transition of said reference clock corresponds to a second level transition of said second set of bi-level signals;

recovering said first digital data in said second circuit; and recovering said clock in said second circuit to provide a recovered clock to said second circuit;

applying a third set of bi-level signals representing the zero values of said second data to said second port of said first capacitor during said second portion of said reference clock cycles; and applying a fourth set of bi-level signals representing the one values of said second data to said second port of said second capacitor during said second portion of said reference clock cycles.

3. An apparatus for transfer of digital data across a capacitor linking a first circuit to a second circuit, said capacitor having a first port connected to said first circuit and a second port connected to said second circuit, wherein a clock is provided by said first circuit to said second circuit through said capacitor, and said digital data is provided to said first circuit by said second circuit through said capacitor, comprising:

a first tri-state buffer receiving said clock as a data input, and having a tri-state enable input;

a first delay element receiving said clock as a data input, and providing as to said tri-state enable input of said first tri-state buffer a signal corresponding to a signal at its input but delayed by a first predetermined delay period;

a first latch having an input coupled to said first port of said capacitor and having an output;

a first storage element having a data input coupled to said output of said first latch, said first storage element storing data in response to said clock;

a second latch having an input coupled to said second port of said capacitor and having an output;

a second storage element having a data input for receiving said digital data to be transferred, having an output, and having a clock input coupled to said output of said second latch responsive to cause said second storage element to store data in response to a signal provided thereto;

a second tri-state buffer having a data input coupled to said output of said second storage element, having a tri-state enable input, and having an output coupled to said second port of said capacitor;

an AND gate having a first input coupled to said output of said second latch, having a second input coupled to said output of said second storage element, and having an output;

a first delay element having an input coupled to said output of said AND gate, and providing as to said tri-state enable input of said second tri-state buffer a signal corresponding to a signal at its input but delayed by a first predetermined delay period.

* * * * *